(12) United States Patent
Koelmans et al.

(10) Patent No.: US 11,308,382 B2
(45) Date of Patent: Apr. 19, 2022

(54) NEUROMORPHIC SYNAPSES

(71) Applicant: INTERNATIONAL BUSINESS MACHINES CORPORATION, Armonk, NY (US)

(72) Inventors: Wabe W. Koelmans, Adliswil (CH); Timoleon Moraitis, Glattpark (CH); Abu Sebastian, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 1224 days.

(21) Appl. No.: 15/686,870

(22) Filed: Aug. 25, 2017

(65) Prior Publication Data

US 2019/0065929 A1  Feb. 28, 2019

(51) Int. Cl.
*G06N 3/00* (2006.01)
*G06N 3/04* (2006.01)
*G06N 3/063* (2006.01)
*G06N 3/08* (2006.01)

(52) U.S. Cl.
CPC .............. *G06N 3/004* (2013.01); *G06N 3/04* (2013.01); *G06N 3/049* (2013.01); *G06N 3/063* (2013.01); *G06N 3/0635* (2013.01); *G06N 3/084* (2013.01); *G06N 3/088* (2013.01)

(58) Field of Classification Search
CPC .......... G06N 3/004; G06N 3/04; G06N 3/049; G06N 3/063; G06N 3/0635
See application file for complete search history.

(56) References Cited

U.S. PATENT DOCUMENTS

| 8,433,665 B2 * | 4/2013 | Tang ................... G06N 3/049 706/33 |
| 9,449,270 B2 | 9/2016 | Hunzinger et al. |
| 9,570,169 B1 | 2/2017 | Czornomaz et al. |
| 2015/0095273 A1 | 4/2015 | Sarah et al. |

(Continued)

OTHER PUBLICATIONS

Garbin, Daniele, et al. "HfO 2-based OxRAM devices as synapses for convolutional neural networks." IEEE Transactions on Electron Devices 62.8 (2015): 2494-2501. (Year: 2015).*

(Continued)

*Primary Examiner* — Benjamin P Geib
(74) *Attorney, Agent, or Firm* — Robert D. Bean

(57) ABSTRACT

Neuromorphic synapse apparatus is provided comprising a synaptic device and a control signal generator. The synaptic device comprises a memory element, disposed between first and second terminals, for conducting a signal between those terminals with an efficacy which corresponds to a synaptic weight in a read mode of operation, and a third terminal operatively coupled to the memory element. The memory element has a non-volatile characteristic, which is programmable to vary the efficacy in response to programming signals applied via the first and second terminals in a write mode of operation, and a volatile characteristic which is controllable to vary the efficacy in response to control signals applied to the third terminal. The control signal generator is responsive to input signals and is adapted to apply control signals to the third terminal in the read and write modes, in dependence on the input signals, to implement predetermined synaptic dynamics.

17 Claims, 6 Drawing Sheets

(56) References Cited

U.S. PATENT DOCUMENTS

2016/0267378 A1      9/2016    Eleftheriou et al.
2017/0083810 A1*   3/2017    Ielmini .................. G06N 3/063

OTHER PUBLICATIONS

Tian et al., "Graphene Dynamic Synapse with Modulatable Plasticity", Nano Letters, Oct. 2015, DOI: 10.1021/acs.nanolett.5b03283, pp. 8013-8019.

Howard et al., "Evolving Spiking Networks with Variable Resistive Memories", Evolutionary Computation, MIT Press Journals, http://www.mitpressjournals.org/doi/full/10.1162/EVCO_a_00103, posted online Feb. 7, 2014, doi: 10.1162/EVCO_a_00103, Copyright 2014 Massachusetts Institute of Technology, vol. 22, Issue 1, Spring 2014, pp. 79-103.

Saighi et al., "Plasticity in memristive devices for spiking neural networks", Frontiers in Neuroscience, Neuromorphic Engineering, published Mar. 2, 2015, doi: 10.3389/fnins.2015.00051, Mar. 2015, vol. 9, Article 51, pp. 1-16.

Kim et al., "NVM Neuromorphic Core with 64k-cell (256-by-256) Phase Change Memory Synaptic Array with On-Chip Neuron Circuits for Continuous In-Situ Learning", 2015 IEEE International Electron Devices Meeting (IEDM), pp. 17.1.1-17.1.4, Dec. 7-9, 2015, Washington, DC, USA.

Ambrogio et al., Unsupervised Learning by Spike Timing Dependent Plasticity in Phase Change Memory (PCM) Synapses, FrontiersinNeuroscience, www.frontiersin.org, Mar. 2016, vol. 10, Article56, pp. 1-12.

Ohno et al., "Short-term plasticity and long-term potentiation mimicked in single inorganic synapses" Nature Materials, vol. 10, Aug. 2011, www.nature.com/naturematerials, pp. 591-595.

Berdan et al., "Emulating short-term synaptic dynamics with memristive devices", Scientific Reports, www.nature.com/scientificreports/. Published: Jan. 4, 2016, pp. 1-9.

* cited by examiner

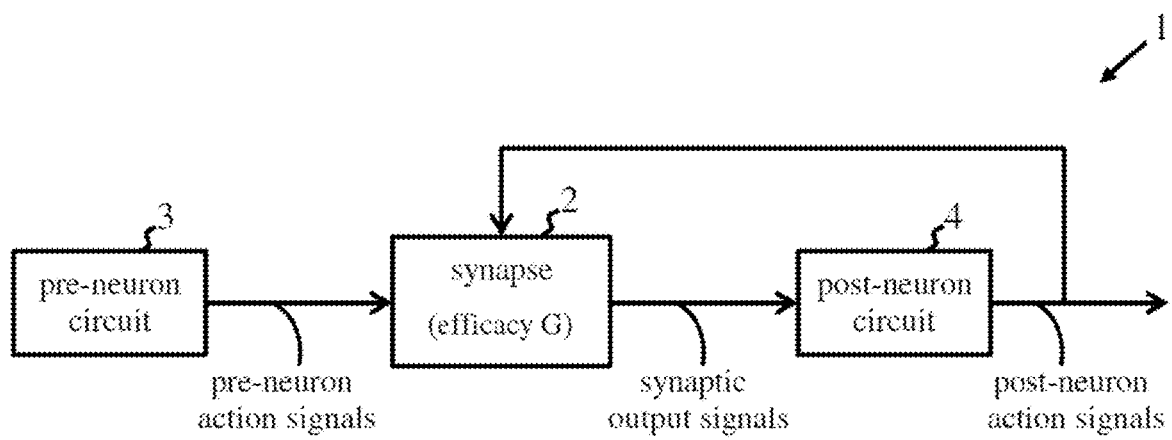
FIG. 1
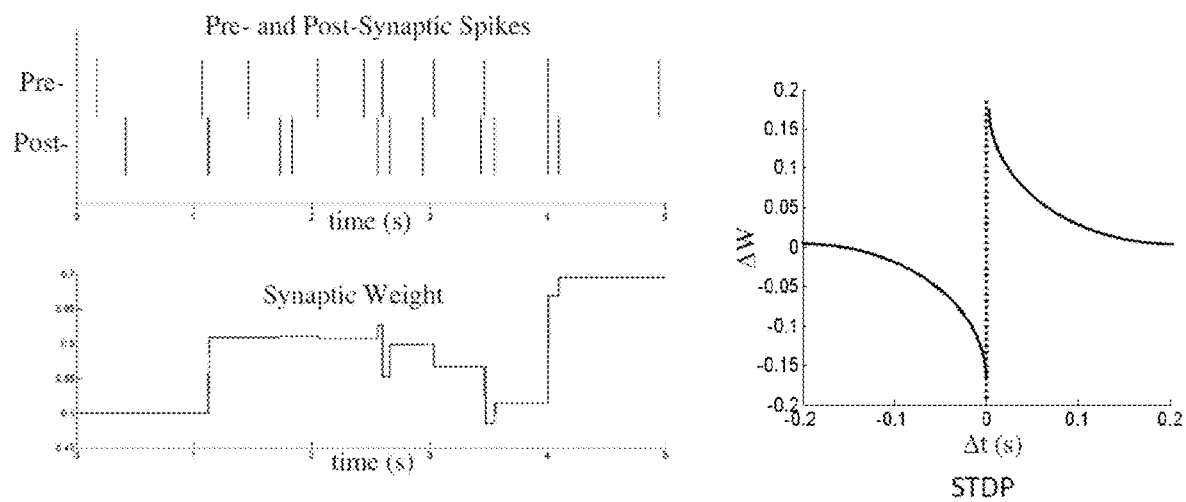
FIG. 2a  FIG. 2b
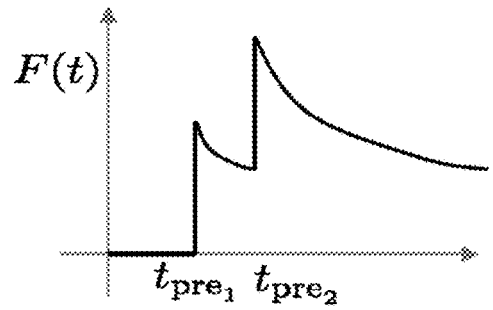
Synaptic fatigue: (f(t) =1-F(t))
FIG. 3

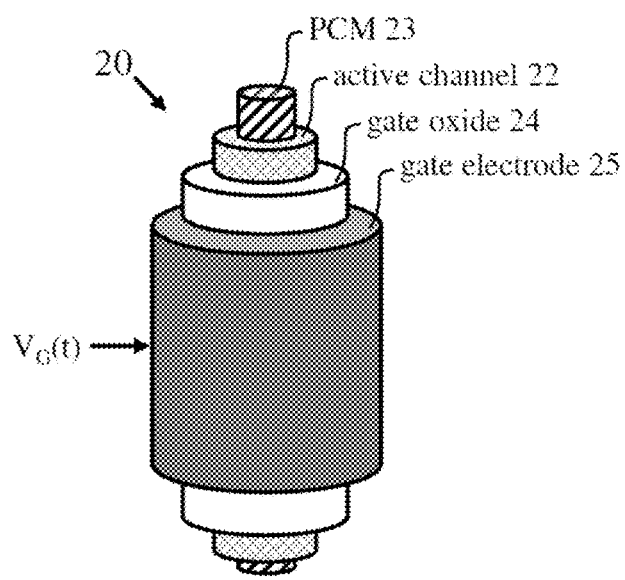
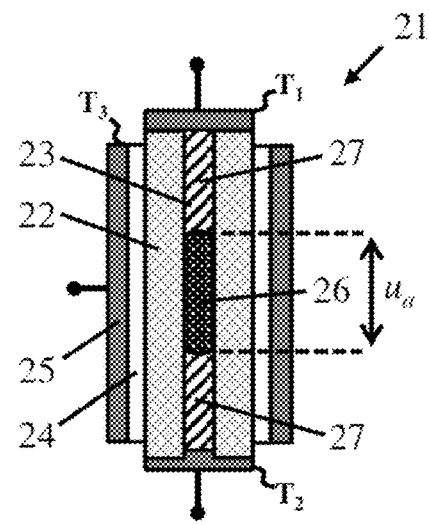
FIG. 6a            FIG. 6b
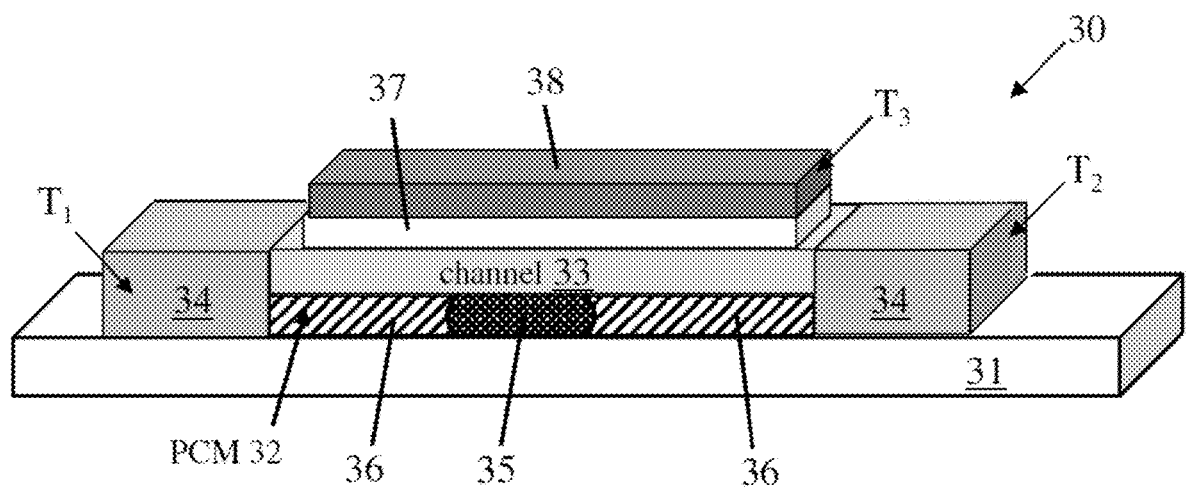
FIG. 7

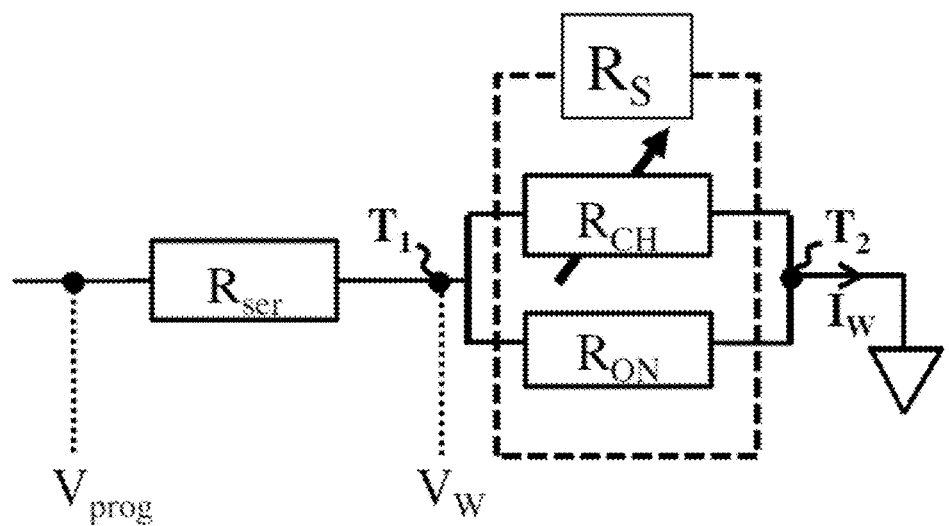
FIG. 13
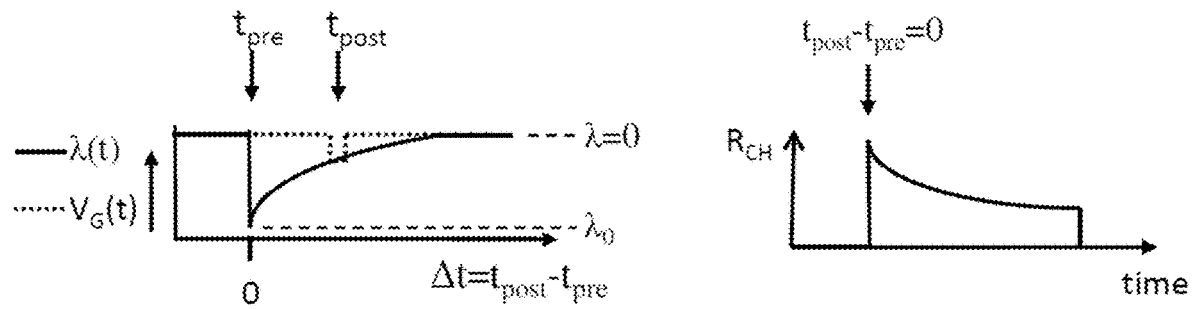
FIG. 14   FIG. 15
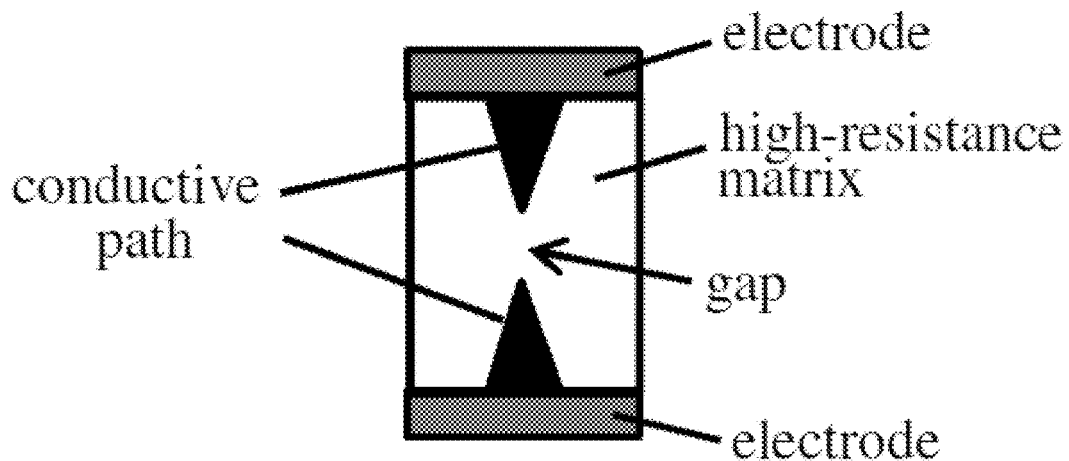
FIG. 16

NEUROMORPHIC SYNAPSES

BACKGROUND

The present invention relates generally to neuromorphic synapses.

Neuromorphic technology relates to computing systems which are inspired by biological architectures of the nervous system. Conventional computing architectures are becoming increasingly inadequate to meet the ever-expanding processing demands placed on modern computer systems. Compared to the human brain, the classical von Neumann computer architecture is highly inefficient in terms of power consumption and space requirements. The human brain occupies less than 2 litres and consumes around 20 W of power. Simulating 5 seconds of brain activity using state-of-the-art supercomputers takes around 500 s and needs 1.4 MW of power. These issues have prompted a significant research effort to understand the highly efficient computational paradigm of the human brain and to create artificial cognitive systems with unprecedented computing power.

Neurons and synapses are two basic computational units in the brain. A neuron can integrate inputs coming from other neurons, in some cases with further inputs (for example from sensory receptors), and generates output signals ("action signals", or "spikes"). A neuron action signal is relayed to other neurons via synapses. A synapse receives action signals from a pre-synaptic neuron ("pre-neuron") and provides output signals to a post-synaptic neuron ("post-neuron"). A synaptic output signal is a graded synaptic potential which depends on the conductance (also known as "synaptic efficacy" or "weight") of the synapse.

Synaptic efficacy can be enhanced or reduced by neuronal activity, and this "plasticity" of synapses is crucial to memory and other brain functions. For example, synaptic efficacy may be modified in response to arrival of pre-neuron action signals, and changes in efficacy may depend on timing of neuron action signals, e.g. relative timing of pre- and post-neuron action signals. Changes in synaptic efficacy may be transient changes, which persist only for a short time and then decay, or long-term changes which persist until some stimulus prompts further update of synaptic weight. Transient efficacy changes are known generally as "short-term plasticity" (STP) effects. Long-term changes are known generally as "long-term plasticity" (LTP) effects. Long-term weight updates may also vary dynamically in dependence on neuronal activity. The overall dynamics of synaptic efficacy may depend on both LTP and STP effects, and the ability to emulate such synaptic dynamics is important to the development of effective neuromorphic networks.

SUMMARY

According to at least one embodiment of the present invention there is provided a neuromorphic synapse apparatus. The apparatus comprises a synaptic device and a control signal generator. The synaptic device comprises a memory element, disposed between first and second terminals, for conducting a signal between those terminals with an efficacy which corresponds to a synaptic weight in a read mode of operation, and a third terminal operatively coupled to the memory element. The memory element has a non-volatile characteristic, which is programmable to vary the efficacy in a non-volatile manner in response to programming signals applied via the first and second terminals in a write mode of operation, and a volatile characteristic which is controllable to vary the efficacy in a volatile manner in response to control signals applied to the third terminal. The control signal generator is responsive to input signals and is adapted to apply control signals to the third terminal in the read and write modes, in dependence on the input signals, to implement predetermined synaptic dynamics.

Embodiments of the invention will be described in more detail below, by way of illustrative and non-limiting example, with reference to the accompanying drawings.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 1 is a schematic representation of a system including a neuromorphic synapse;

FIGS. 2a and 2b illustrate an example of a dynamic LTP effect;

FIG. 3 illustrates an example of an STP effect;

FIGS. 6a and 6b show an embodiment of a synaptic device based on phase-change memory material in the FIG. 5 apparatus;

FIG. 7 shows another embodiment of a synaptic device based on phase-change memory material;

FIG. 13 indicates an effective configuration of the synaptic device in a write operation;

FIGS. 14 and 15 indicate operation of the synapse apparatus to implement a dynamic LTP effect; and FIG. 16 illustrates a mechanism underlying an alternative resistive memory material for use in synaptic devices embodying the invention.

DETAILED DESCRIPTION

Figure 4:
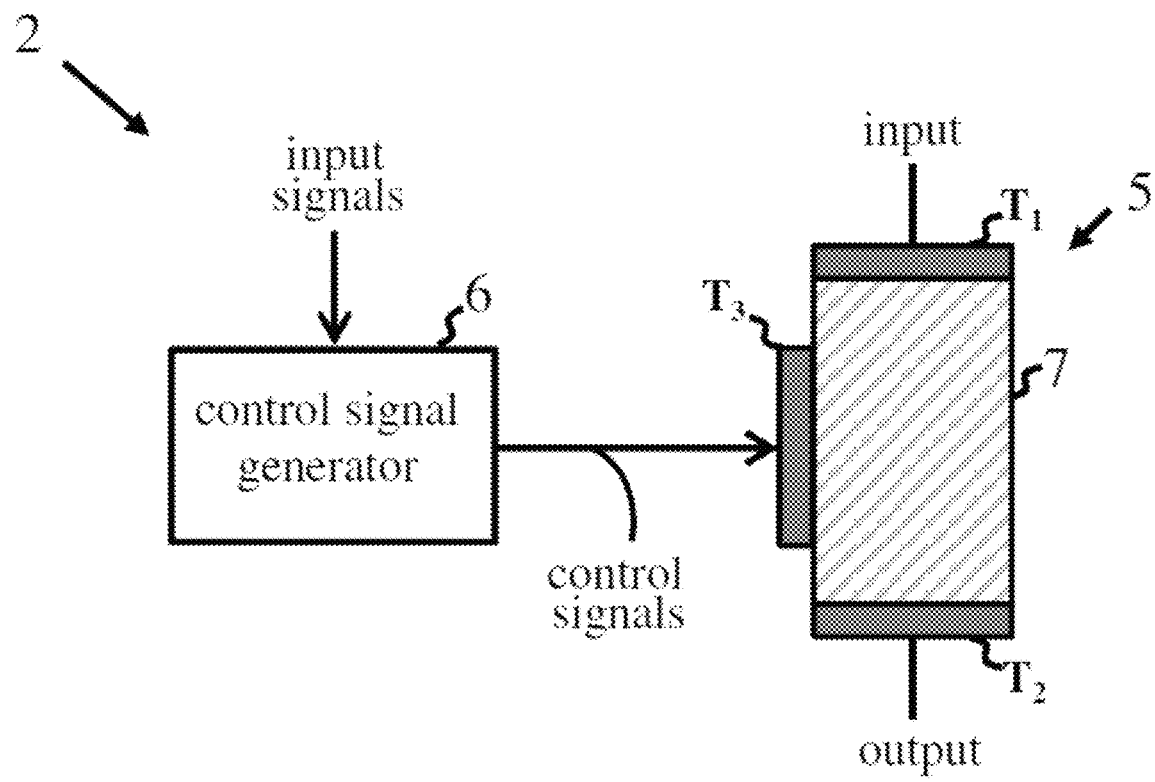
FIG. 4 is a schematic representation of synapse apparatus embodying the invention.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

FIG. 1 is a schematic representation of a simple neuromorphic system 1. The system 1 may include synapse apparatus 2, implementing a neuromorphic synapse, arranged for communication of signals between a pre-neuron circuit 3, operable to produce pre-neuron action signals, and a post-neuron circuit 4 operable to produce post-neuron action signals. In particular, the synapse apparatus 2 may receive action signals generated by pre-neuron circuit 3 and may provide synaptic output signals to post-neuron circuit 4. The pre- and post-neuron circuits 3, 4 may generate their respective action signals at arbitrary timings dependent on inputs (not shown) from other neuron circuits in a computational arrangement of which system 1 may form a part. Each neuron circuit may typically accumulate inputs from its connected circuits and may "fire", generating its output action signal, if the accumulated inputs exceed a threshold value. Such neuron circuits may be implemented in a variety of ways and the particular implementation may be orthogonal to the synapse operation described herein. In a typical arrangement, system 1 may form part of an array of interconnected neuron circuits, with each neuron circuit optionally being connected to a plurality of the other neuron circuits via respective synapses, each implemented by synapse apparatus 2.

A synaptic output signal produced by synapse 2 in response to a pre-neuron action signal may be a weighted signal whose strength depends on the synaptic conductance or efficacy, denoted here by G, at that point in time. The synaptic efficacy G may be varied in response to neuronal activity to provide the synaptic plasticity discussed above. For example, the efficacy G may be updated by arrival of pre- and/or post-neuron action signals, and changes in efficacy may depend on timing of both pre- and post-neuron action signals, as indicated by back-propagation of post-neuron action signals to synapse 2 in FIG. 1. Changes in the efficacy G may include both transient changes, which are governed by STP rules, and stable or long-term changes which are governed by LTP rules. In particular, synaptic efficacy G can be considered as a compound of a long-term synaptic conductance or weight, denoted herein by W, and a function f=f(STP) defining transient STP effects, e.g. G=f*W (where * denotes multiplication herein). LTP effects include changes $\Delta W$ to the long-term synaptic weight W, e.g. in response to neuron action signals: $W_{new}=W_{old}+\Delta W$. The update value $\Delta W$ may depend on the current synaptic weight $W_{old}$, and may vary dynamically according to dynamic LTP rules ($\Delta W=\Delta W(LTP)$), e.g. based on neuronal activity.

FIGS. 2a and 2b depict one example of a dynamic LTP effect whereby weight updates $\Delta W$ depend on relative timing of pre- and post-neuron action signals. This effect is commonly referred to as spike-timing dependent plasticity (STDP). The upper diagram in FIG. 2a indicates timing of pre- and post-neuron action signals (spikes). The lower diagram indicates variation in synaptic weight W on the same timescale. These changes may follow an STDP rule illustrated in FIG. 2b. This shows the variation in $\Delta W$ with time difference $\Delta t$ between post-neuron spike (post-spike) time $t_{post}$ and pre-neuron spike (pre-spike) time $t_{pre}$: $\Delta t=t_{post}-t_{pre}$. $\Delta W$ is zero (no change in synaptic weight) if the time difference $\Delta t$ is above a certain magnitude, here 0.2 s. The magnitude of $\Delta W$ increases with decreasing time difference $\Delta t$. $\Delta W$ is positive (increase in synaptic weight) if the post-spike follows the pre-spike, and negative (decrease in synaptic weight) if the pre-spike follows the post-spike.

FIG. 3 shows an example of an STP effect, commonly referred to as synaptic fatigue, whereby the function f=f (STP) varies in dependence on pre-spike timing. In this example, f(STP)=(1−F(t)), where the function F(t) changes in dependence on pre-spikes, shown here at times $t_{pre1}$ and $t_{pre2}$, as indicated. More frequent pre-spikes thus result in decreasing values of f, tending to reduce synaptic efficacy G, with the effect gradually diminishing with time after the last pre-spike.

FIG. 4 illustrates neuromorphic synapse apparatus 2. The apparatus 2 may comprise a synaptic device, indicated generally at 5, and a control signal generator 6. The synaptic device 5 may further comprise a memory element 7 disposed between first and second terminals $T_1$, $T_2$ of the device, and a third terminal $T_3$ may be operatively coupled to the memory element 7. The third terminal $T_3$ is illustrated schematically here in contact with memory element 7 at a location between the end terminals $T_1$, $T_2$. Memory element 7 may be operable to conduct a signal between the end terminals $T_1$, $T_2$ with an efficacy which may be variable in operation. In the schematic shown here, terminal $T_1$ is shown connected to an input for receiving a signal applied to the device, and terminal $T_2$ may be connected to an output for providing an output signal of the device. As explained in detail below, the memory element 7 may have a non-volatile characteristic which may be programmable to vary the conductive efficacy of the element in a non-volatile manner in response to programming signals applied via the first and second terminals $T_1$, $T_2$. These programming signals may be applied in a write mode of operation of the synapse apparatus. The memory element 7 may also have a volatile characteristic which may be controllable to vary the efficacy in a volatile manner in response to control signals applied to the third terminal $T_3$. These control signals may be generated by control signal generator 6. In particular, the control signal generator may be responsive to input signals, discussed further below, and may be adapted to apply control signals to the third terminal $T_3$ in dependence on the input signals. These control signals may be applied by control signal generator 6 as required and over a period of time which may typically be within a few microseconds to a few seconds.

The synapse apparatus 2 may be operable in write and read modes. The write mode may correspond to the weight-update operation whereby the long-term synaptic weight W is updated in dependence on an event, e.g. receipt of a neuron action signal, prompting a long-term (non-volatile) change in synaptic efficacy. In such an update operation (a "programming" or "write" operation), a programming signal may be applied to the synaptic device via terminals $T_1$ and $T_2$ to program the non-volatile characteristic of memory element 7, effecting a desired long-term change in conductive efficacy. The read mode may implement the weighted signal transmission function of the synapse. In this mode, a read signal may be applied to the synaptic device via terminals $T_1$ and $T_2$ and the resulting output signal, which may depend on the conductive efficacy of memory element 7, may provide the (weighted) synaptic output signal. The efficacy with which the read signal is conducted in the read mode may thus correspond to the synaptic weight for the weighted signal transmission. In both write and read operations, the overall conductive efficacy of memory element 7 may be controlled by controlling the volatile characteristic of the memory element via application of control signals to the terminal $T_3$. By varying conductive efficacy due to the volatile characteristic in the read mode, the overall efficacy of memory element 7 may be controlled to vary the synaptic output signal accordingly. In the write mode, varying conductive efficacy via control of the volatile characteristic may affect the programming operation, varying the effect of the programming signal on the volatile characteristic, and thus may affect the resulting long-term change in synaptic weight.

The control signal generator 6 may be adapted to apply control signals to the third terminal $T_3$ in the read and write modes, in dependence on the input signals, to implement predetermined synaptic dynamics. In particular, control signals may be applied in the read mode to implement transient changes in synaptic efficacy, without affecting the long-term synaptic weight, and thereby may implement a desired STP rule. Control signals may be applied in the write mode to control long-term changes in synaptic efficacy, and thus may implement a desired LTP rule. The rules according to which synaptic efficacy changes may be selected as desired and implemented via application of appropriate control signals. In this way, synapse 2 may effectively implement arbitrary synaptic dynamics. This may provide an efficient neuromorphic synapse with simple, on-device tuning of synaptic dynamics. Additional circuitry for adjusting programming/output signals to achieve modified dynamics may not be required. A wide range of synaptic dynamics can be achieved, well beyond those achievable due to physics of the non-volatile memory mechanism per se.

The input signals to control signal generator 6 may indicate the events prompting a read or write operation and the events or other variables on which the LTP and STP rules implemented by the synapse may depend. Depending on the particular dynamics implemented, the input signals may comprise at least one of the pre-neuron action signals and the post-neuron action signals. In the embodiments detailed below, the input signals comprise both pre- and post-neuron action signals. A read operation, for example, may be prompted by receipt of a pre-neuron action signal as an input signal to the control generator. A control signal applied in the read operation may depend, for example, on timing of the pre-neuron action signals, e.g. on rate and/or absolute arrival time of the pre-spikes. A write operation may be prompted, for example, by receipt of a pre-spike, a post-spike, or in dependence on time difference between pre- and post-spikes. A control signal applied in the write operation may depend, for example, on absolute or relative timing of pre- and/or post spikes. In general, however, STP/LTP rules may depend on one or more variables, including variables related to: absolute/relative timing of spikes; other properties such as the form, shape, amplitude, duration, power, etc. of spikes; properties of pre- and/or post-neuron circuits (such as the so-called "membrane potential" which provides a metric for the accumulation state of the circuit which determines when the neuron "fires"); the instantaneous rate of pre- and/or post-spikes; the output of neural network optimization techniques such as backpropagation of errors; or generally any property of a neuromorphic system relevant to synaptic operation.

While write and read operations of synapse 2 are performed in distinct write and read modes, the individual operations may be performed as appropriate in a given application scenario. In a simple operating scenario, a write operation may be performed (if required according to an LTP rule) on receipt of a pre-spike from pre-neuron 3, and a read operation may then be performed to transmit the weighted signal to post-neuron 4. Read and write operations may, however, be performed in a different order, and applications can be envisaged in which only write, or only read, operations are performed at a given time. For example, write operations may be performed in a training/learning phase of a neuronal network, and read operations may then be performed in a subsequent application phase.

A programming (or "write") signal applied to device 5 in the write mode may be a pre- or post-spike per se, or may be a signal (such as a voltage pulse or pulse series) generated therefrom or generated independently in response to a spike or other event prompting the write operation. Such a write signal may be generated by control signal generator 6 or via other circuitry (not shown but of generally known form) which may generate signals globally in a neuromorphic system. Similarly, a read signal applied to device 5 in the read mode may be a spike or other signal, such as a voltage pulse, generated therefrom or generated independently in response to a read event.

The synaptic output signal may be derived in any convenient manner, and may comprise the signal conducted by device 5 or a signal dependent thereon. The synaptic output signal may, for example, be dependent on current or voltage at the output terminal, or voltage across the device, or a current or voltage level in circuitry connected to the device, e.g. current in/voltage across a parallel/serial resistor connected to device 5.

Figure 5:
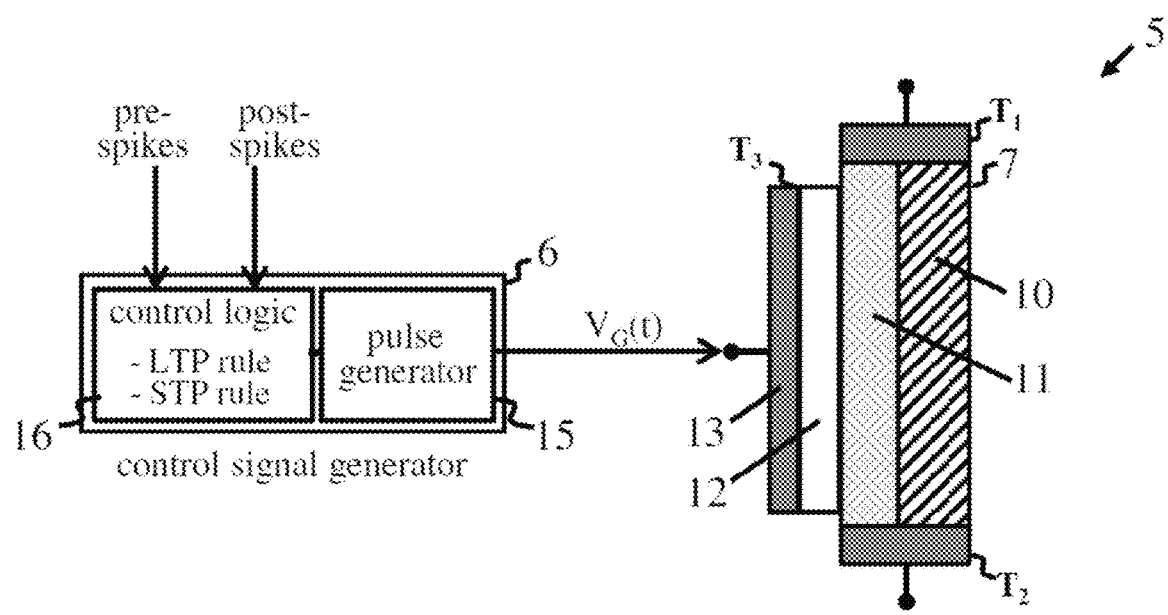
FIG. 5 shows an exemplary implementation of the synapse apparatus of FIG. 4.

FIG. 5 shows an exemplary implementation of synapse apparatus 2 in more detail. Components corresponding to those in FIG. 4 are indicated by like references. The memory element 7 in this embodiment comprises a resistive memory material 10 and a variable-resistance channel component 11 each extending between the first and second terminals $T_1$ and $T_2$. The third terminal $T_3$ of the synaptic device may comprise a gate terminal provided on the channel component 11 for controlling resistance of the channel component.

Resistive memory material 10 may comprise, for example, a phase-change memory (PCM) material. As explained in more detail below, such resistive memory materials exhibit a memristive property whereby a non-volatile characteristic of the material can be programmed to different states, displaying different electrical resistance, via application of programming signals to the material. Resistance of material 10 can thus be programmed via application of programming signals via device terminals $T_1$ and $T_2$ in the write mode to vary resistance of device 5 in a non-volatile manner.

Channel component 11 may be formed, for example, of polysilicon or other semiconductor material. The gate terminal $T_3$ may comprise a gate oxide layer 12 and a gate electrode 13. The gate terminal and channel component may effectively operate as a field-effect transistor whereby resistance of the channel component can be varied by controlling formation of a conductive channel along the semiconductor material of the channel component via application of control voltages $V_G(t)$ to gate electrode 13. Channel component 11 may thus provide a resistance which can be varied in a volatile manner in response to gate control signals $V_G(t)$.

The control signal generator 6 may comprise a pulse generator 15, which may generate voltage pulses $V_G(t)$, and control logic 16 which may controls operation of pulse generator 16. Control logic 16 may be implemented, in general, in hardware or software or a combination thereof, and suitable implementations will be apparent to those skilled in the art from the description of operation herein. In this embodiment, control logic 16 may implement a predetermined LTP rule by controlling generation of control pulses $V_G(t)$ in the write mode to tune the programming of resistive memory component 10. The control logic may also implement a predetermined STP rule by controlling generation of control pulses $V_G(t)$ in the read mode to control resistance of channel component 11. The input signals to control logic 16 in this embodiment comprise both pre- and post-neuron action signals. In this example, the STP rule implemented by control logic 16 may depend on timing of the pre-neuron action signals. The LTP rule may depends on relative timing of the pre- and post-neuron action signals.

To assist understanding of the embodiments described, a brief description of the properties of PCM elements (or "cells") is given in the following.

The variable-resistance properties of PCM cells arise from heating a volume of phase-change material (typically a chalcogenide compound such as GST (Germanium-Antimony-Tellurium)), disposed between the cell terminals so as to change the relative proportions of a (high-resistance) amorphous phase and a (low-resistance) crystalline phase in the chalcogenide volume. (The terms "high-resistance" and "low-resistance" are used herein as comparative terms only and no particular constraints are implied as to specific resistance values). If a voltage less than a certain threshold switching voltage is applied via the cell terminals, the current will be so small that there will be very little Joule heating and substantially no phase change in the cell volume. However, if a programming ("write") signal above the threshold voltage is applied, cell resistance drops to a very low value during application of the signal through the phenomenon of electronic threshold switching. This enables flow of a large current which results in significant Joule heating and subsequent phase change. The relative proportions of the amorphous and crystalline regions in the cell volume can be varied by controlling characteristics (e.g. amplitude, duration, power) of signals applied to the cell. The overall electrical resistance of the cell can thus be set to desired programming levels, corresponding to different relative proportions of amorphous/crystalline material, by controlling the applied signals. Cell resistance can be determined in a read operation by applying a low-voltage read signal to the cell terminals and measuring the resulting current flow through the cell. The signal level for the read operation may be below the switching threshold of the PCM material so that the read operation does not disturb the programmed state.

FIGS. 6a and 6b are schematic illustrations of a preferred embodiment of synaptic device 5 employing PCM material. FIG. 6a shows an elevational view, partially cut-away, of the memory element 20 of this embodiment, and FIG. 6b shows a cross-section of the synaptic device 21 with memory element 20. The channel component of memory element 20 may comprise an elongate annulus of semiconductor material 22. The resistive memory component may be provided by an elongate core of PCM material 23 disposed within the annulus. The gate terminal $T_3$ may provided on an outer surface of the annulus as a layer of gate oxide 24 and a gate electrode layer 25. As seen in FIG. 6b, the channel component 22 may extend between the end terminals $T_1$ and $T_2$, in contact with the PCM material 23, and may contact both end terminals in this embodiment. The PCM material 23 is shown in the figure containing a (high-resistance) amorphous phase, indicated by region 26, and a (low-resistance) crystalline phase, indicated by regions 27. Respective lengths along the channel component (i.e. in a direction between terminals $T_1$ and $T_2$) of these high- and low-resistance regions can be varied in response to programming signals to program resistance of the PCM material as described above. In particular, the length $u_a$ of the amorphous region 26 can be varied, with consequent variation in combined length of the crystalline regions 27, by application of programming signals via end terminals $T_1$, $T_2$.

FIG. 7 is a schematic elevational view of an alternative embodiment of synaptic device 5. In this "lateral" design, the synaptic device 30 may be formed on an insulating substrate 31. The memory element may comprise a layer 32 of PCM material overlaid by a semiconductor layer, providing channel component 33, in contact with PCM layer 32. The layers 32, 33 may extend over substrate 31 in a direction between two electrode layers 34 which provide end terminals $T_1$ and $T_2$. PCM layer 32 is shown containing an amorphous region 35 and crystalline regions 36, the lengths of which along channel component 33 may be varied by programming as described above. The gate terminal $T_3$ may comprise a layer of gate oxide 37 and a gate electrode layer 38 formed over channel component 33.

The PCM material in the above embodiments may comprise a chalcogenide compound such as GST. Alternative PCM materials may include other compounds of some or all elements Ge, Ga, Sb and Te, such as $Ge_2Sb_2Te_5$, GeTe, $Ge_{15}Sb_{85}$, and GaSb for example. Such compounds may also have added constituents such as carbon, nitrogen, silicon, or silicon dioxide for instance. Other possible materials may include In—Ge—Te alloys, Si—Sb—Te alloys and Si—Sb alloys. The channel component may be formed of p-doped polysilicon, or other (doped or undoped) semiconductor materials such as, for example, $Si_xGe_{1-x}$ (x=0 to 1), InGaAS or other III-V semiconductors, polysilicon, amorphous silicon or amorphous Ge. The gate oxide layers may be formed of e.g. $SiO_2$, $Al_2O_3$, $HfO_2$, Hf-Silicates, SiON, $ZrO_2$ or multi-layer combinations of these. The gate electrodes may be formed of e.g. doped polysilicon, doped amorphous silicon or metals such as TiN, TaN, Al and W. The various components can be fabricated as an integrated nanoscale system using well-known material processing techniques.

Figure 8:
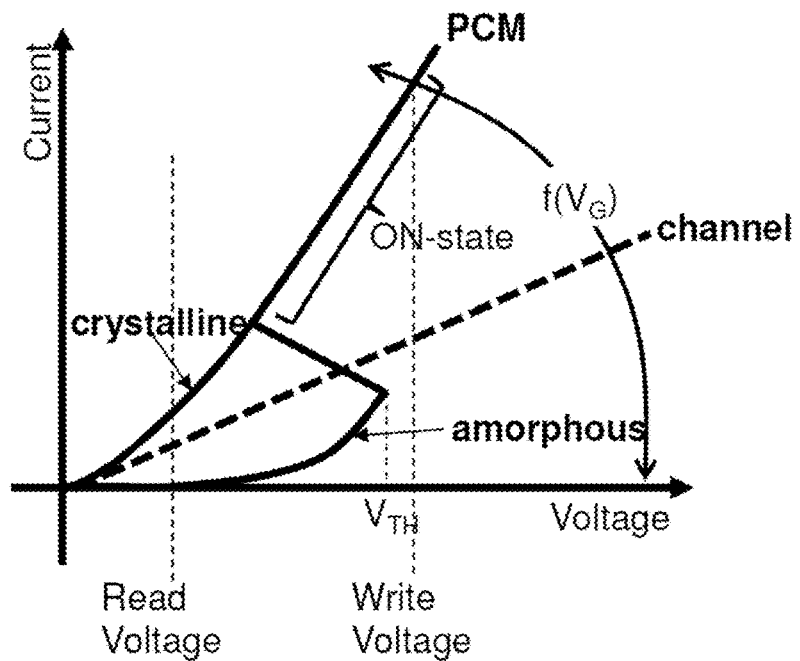
FIG. 8 is a schematic diagram illustrating characteristics of the devices of FIGS. 6a, 6b and 7.
Figure 9:
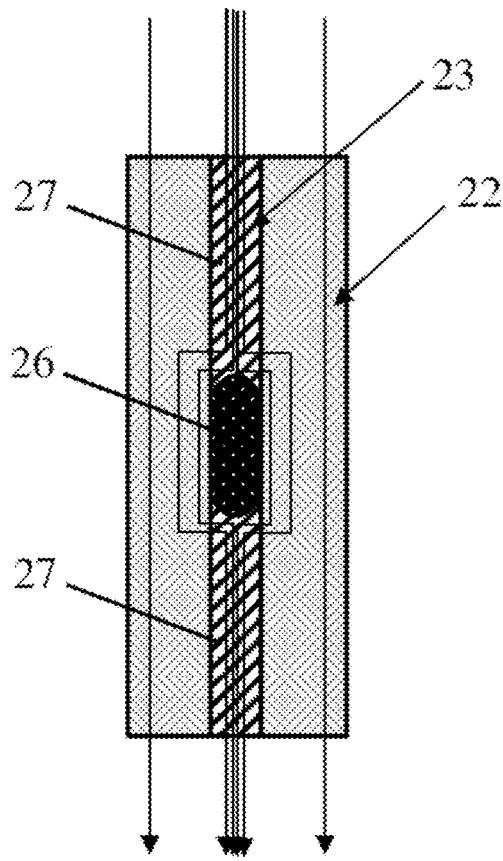
FIG. 9 illustrates a projection effect in a read operation of the synapse apparatus.

Synaptic devices 21, 30 may provide efficient memory element structures in which a "projection effect" can be exploited for enhanced accuracy in read mode operation. This effect can be understood from FIG. 8 which is a schematic illustration of the current/voltage (and hence resistance) characteristics of the material components of the memory element of synaptic devices 21, 30. The solid lines indicate variation of current through PCM material 23, 32 with voltage across terminals $T_1$ and $T_2$, starting from the fully-crystalline state (upper curve) and the fully-amorphous state (lower curve). These two curves reflect the large (typically 3 orders of magnitude) variation in resistivity between the crystalline and amorphous phases. It can be seen that, at low voltages (as used for the read signal), the resistance of the amorphous and crystalline regions may be markedly different. The dashed line in the plot represents the variable-resistance characteristic of channel component 22, 33 whose resistance can be varied as a function of control voltage $V_G$ at gate terminal $T_3$. Control signal generator 6 may be adapted such that control voltages $V_G$ for the read operation provide a resistance of the channel component which may be between that of the amorphous and crystalline regions of the PCM material. The resulting current flow during a read operation is indicated schematically in FIG. 9 for the device structure of FIG. 6b. In FIG. 9, current density is indicated schematically by spacing of the vertical arrows. Due to the resistance properties described above, in a read operation current flows primarily through the crystalline phase 27 of the PCM material in preference to the channel 22, and primarily through channel 22 in preference to the amorphous phase 26 of the PCM material. The resulting current path through the channel has a length which may be directly dependent on the amorphous length $u_a$ which may be effectively "projected onto" the channel component. This mitigates against adverse stochastic effects such as noise and resistance variations associated with the amorphous phase of PCM material, enhancing accuracy of the weighted signal transmission function.

Referring back to FIG. 8, the amorphous PCM phase may exhibits a non-linear characteristic with a threshold switching phenomenon that may be field induced. At a certain threshold voltage $V_{TH}$ across the end terminals, this phase may switch to a very low "ON-state" resistance corresponding to that of the crystalline PCM material. A write voltage $V_{write}$ used for programming in the write mode may be selected to be above this switching threshold, enabling flow of a large write current to effect phase change as described above.

Figure 10:
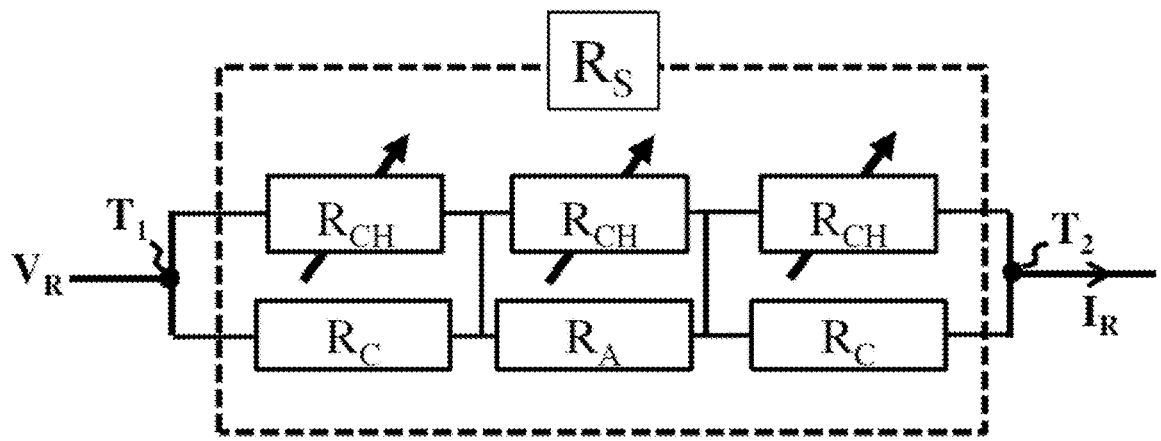
FIG. 10 indicates an effective configuration of the synaptic device in the read operation.

Read and write operations of the FIG. 5 synapse will now be described in more detail. The read mode will be described first for an example in which the STP rule implemented by control logic 16 corresponds to the synaptic fatigue rule of FIG. 3. FIG. 10 shows the effective configuration of the synaptic device 5, having a PCM component 23, 32 as described above, in the read mode. The overall resistance $R_S$ of the synaptic device may be illustrated schematically as a network of resistors providing the parallel resistances of the channel component 11 and PCM material 12. The resistance of PCM material 12 may be represented as shown by serially-connected resistors $R_C$ and $R_A$ corresponding to resistance of the crystalline and amorphous phases respectively of PCM component 23 (FIG. 6b) or PCM component 32 (FIG. 7). Each of these resistors may be connected in parallel with a variable resistance (all denoted by $R_{CH}$ for simplicity) corresponding to resistance of the parallel segment of channel component 22 or 33. A read voltage $V_R$ may be applied at terminal $T_1$ for the read operation, resulting in a current $I_R$ through the device. The read voltage may be weighted according to $I_R=V_R*G$, where $G=(R_S)^{-1}$ may be the conductance which corresponds to synaptic efficacy. Since $R_C<R_{CH}<<R_A$ in the read mode, the resistance $R_S$, and hence synaptic efficacy G, depend strongly on $R_{CH}$.

Figure 11:
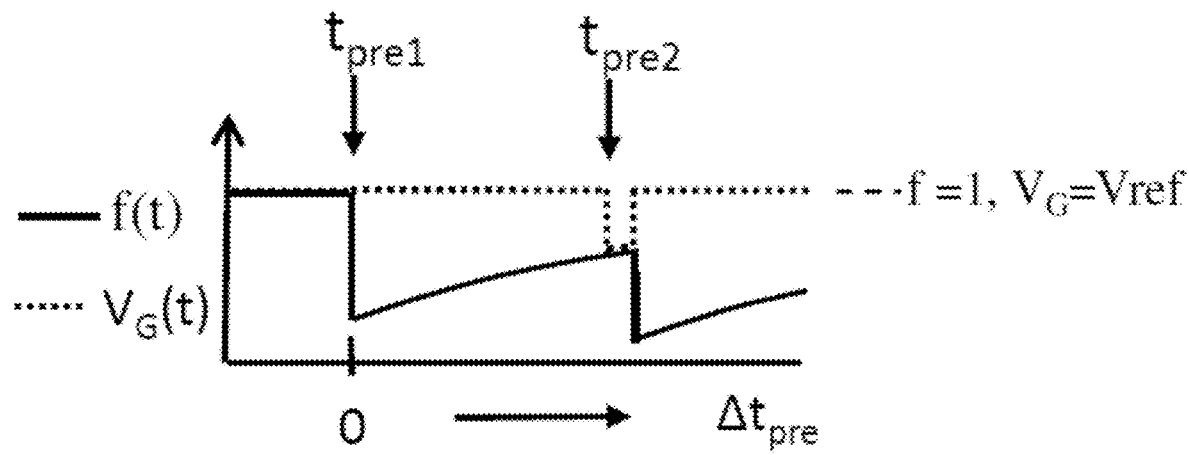
FIGS. 11 and 12 indicate operation of the synapse apparatus to implement an STP effect.
Figure 12:
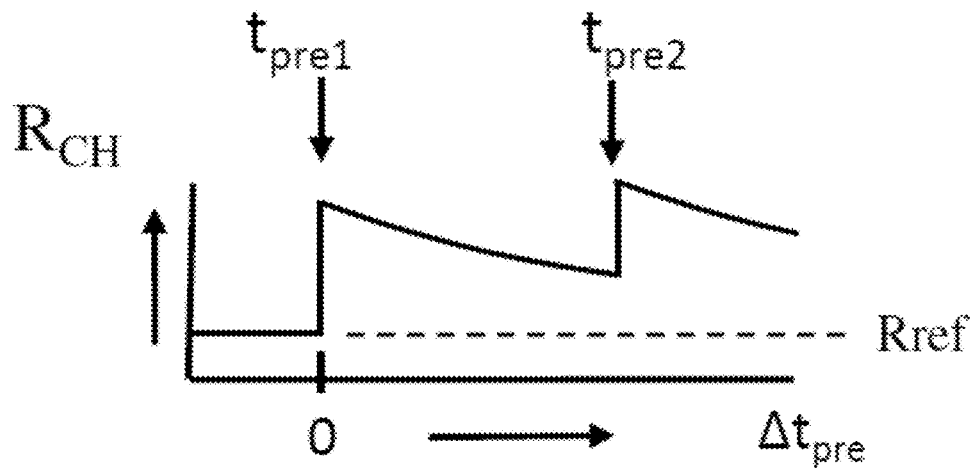

As discussed earlier, the conductance G can be represented as a compound $G=W*f$ of the long-term synaptic weight W, stored here by the PCM material, and a function f(STP) defining the STP rule, here the synaptic fatigue function f(t) of FIG. 3. Hence, $I_R=V_R*f(t)*W$. The control logic 16 may generate control signals $V_G(t)$ in the read mode, in dependence on timing of the pre-neuron action signals, to implement the synaptic-fatigue function f(t) by controlling resistance of the channel component. FIGS. 11 and 12 illustrate this principle. The solid line in FIG. 11 may indicate how the function f(t) varies with time difference $\Delta t_{pre}$ between pre-spikes, shown occurring here at times $t_{pre1}$ and $t_{pre2}$ accordance with FIG. 3. FIG. 12 indicates how resistance $R_{CH}$ of the channel component would be varied with time difference $\Delta t_{pre}$. The appropriate channel resistance $R_{CH}$ at a read event may be achieved via application of voltage signals $V_G$ to gate terminal $T_3$.

The dashed line in FIG. 11 indicates the level at which control voltage $V_G(t)$ may be applied for a read operation. This control voltage $V_G(t)$ may be applied at the read operation, which may occur here in response to each pre-spike. At the first pre-spike time, a pre-spike $t_{pre1}$, has not occurred for sufficient time that the function F(t) in FIG. 3 has decayed to zero, and f=1. This corresponds to no STP effect on synaptic weight, and the control voltage $V_G$ applied for that read operation corresponds to a reference voltage level $V_{ref}$. The resistance $R_{CH}$ of the channel component may be thus set to a reference level $R_{ref}$ whereby, in effect, the overall resistance $R_s$ of the synapse may depend solely on the long-term weight W stored by the PCM material. The first pre-spike thus may be weighted in the normal way: $I_{R(spike1)}=V_R*W$. The STP function f(t) decreases sharply at time $t_{pre1}$ and slowly increases. For the read operation at the next pre-spike time, $t_{pre2}$, a control voltage $V_G<V_{ref}$ may be applied as indicated, corresponding to the value of f(t) at that instant. This gives a channel resistance $R_{CH}>R_{ref}$ as indicated in FIG. 12, modifying the overall resistance $R_s$ of the synapse, and hence synaptic efficacy G, according to the STP rule. The overall resistance $R_s$ thus may be a function of the long-term weight W and $(t_{pre2}-t_{pre1})$, with the interval $(t_{pre2}-t_{pre1})$ determining the overall STP change in synaptic efficacy, whereby $I_{R(spike2)}=V_R*f(t)*W$ as required.

Write mode operation will be described for an example in which the LTP rule implemented by control logic 16 may be based on an STDP rule corresponding to the right-hand side of FIG. 2b. FIG. 13 shows the effective configuration of the synaptic device 5 in the write mode. In this example, a programming voltage $V_{prog}$ may be applied via a series resistor $R_{ser}$ connected to terminal $T_1$ of synaptic device 5, providing a write voltage $V_W>V_{TH}$ across the device. The overall resistance $R_S$ of device 5 may be represented by variable resistance $R_{CH}$ of the channel component 11 in parallel with the ON-state resistance $R_{ON}$ ($<<R_A$) of the PCM material 12. The write voltage may program resistance of the PCM component 12 to update the long term synaptic weight W according to $W_{new}=W_{old}+\Delta W(LTP)$. The update value $\Delta W(LTP)$ can be represented as $\Delta W(LTP)=\lambda*P(W_{old}, V_W)$, where P may be a transfer function for the device which depends on device characteristics such as materials and dimensions of components. The function $\lambda$ may represent the dynamic LTP rule, here the STDP rule which depends on timing $t_{post}$, $t_{pre}$ of the pre-neuron and post-neuron spikes: $\lambda(STDP)=\lambda(t_{post}, t_{pre})$.

In the write mode, control logic 16 may generate control signals $V_G(t)$ to implement the STDP function $\lambda$ by controlling resistance of the channel component during the programming operation in dependence on time difference $\Delta t=(t_{post}-t_{pre})$. FIGS. 14 and 15 illustrate this principle. The solid line in FIG. 14 indicates how the function $\lambda(t)$ varies with time difference $\Delta t=(t_{post}-t_{pre})$ between pre- and post-spikes in accordance with FIG. 2b. FIG. 15 indicates how resistance $R_{CH}$ of the channel component would be varied with time difference $\Delta t$. The appropriate channel resistance $R_{CH}$ at a write event may be achieved via application of voltage signals $V_G$ to gate terminal $T_3$. Decreasing the control voltage $V_G$ increases the resistance $R_{CH}$ of the channel component. This causes more of the current $I_W$ passing through the synaptic device to pass through the PCM component, increasing the weight change $\Delta W$ of the PCM material.

The dashed line in FIG. 14 indicates the level at which control voltage $V_G(t)$ may be applied for a write operation. This control voltage $V_G(t)$ may be applied at the write operation, here in response to a post-spike, as required. Assuming for simplicity that $P(W_{old}, V_W)=c$ where c may be a constant (i.e. the updates of the PCM memory are independent of $W_{old}$) for a given gate voltage, and that c<0, then according to the STDP rule, a post-spike should not cause any weight update if the last pre-spike was long before, so $\lambda$ should equal 0 in this case. When the presynaptic spike arrives at time $t_{pre}$ as shown in FIG. 14, $\lambda=0$. At this time $t_{pre}$, $\Delta t=0$ and any hypothetical occurrence of a postsynaptic spike should cause a maximal weight update, with $\lambda$ set to an absolute maximal value $|\lambda_0|$ at $t=t_{pre}$ and then exponentially relaxing to 0 according to the STDP rule. If c<0 and $\lambda_0<0$ as here, then the weight update $\Delta W=\lambda_0*c$ may be positive (increase in conductance; decrease in resistance $R_S$). A postsynaptic spike occurring immediately after a presynaptic one would therefore cause a maximum positive change in weight. This would be achieved by an application of a write pulse $V_W$ accompanied by a minimum control voltage applied to the terminal $T_3$, increasing resistance $R_{CH}$ to a maximal value as shown in FIG. 15. This causes a larger proportion of the current $I_W$ to pass through the PCM component, resulting in maximum decrease in resistance $R_S$ and hence maximum increase $\Delta W$ in synaptic weight. The write operation here occurs later, at the post-spike at time $t_{post}$. A control voltage $V_G$ higher than the minimum may be applied as indicated to produce a less-than maximal channel resistance $R_{CH}$, and hence a smaller weight update $\Delta W$ corresponding to the value of $\lambda(t)$ at that instant. By controlling the gate voltage $V_G$ in this way, the write operation may be influenced without changing the programming signal $V_{prog}$ itself.

The embodiments described provide highly-efficient implementations for neuromorphic synapses permitting flexible, on-device tuning of synaptic dynamics. Synaptic dynamics can be modified by simple application of control signals to the gate terminal $T_3$, with STP effects implemented by tuning the read operation, and LTP effects implemented by tuning the write operation.

Various changes and modifications can of course be made to the exemplary embodiments described. The STP and/or LTP rule implemented by control logic 16 may in general comprise one or more component rules, allowing efficient implementation of arbitrary synaptic dynamics.

While the non-volatile storage of device 5 is based on PCM cells above, other resistive memory elements may be employed in other embodiments. Some examples include resistive RAM (RRAM) cells such as conductive bridge RRAM cells, oxide or metal-oxide RRAM cells, and carbon RRAM cells. The variable resistance properties of such cells arise from formation of an electrically-conductive path within a high-resistance matrix disposed between two electrodes as illustrated schematically in FIG. 15. The length of the conductive path, and hence length of the high-resistance "gap" in the path, can be varied by application of programming signals to the electrodes, thus varying the non-volatile resistance. Such a path may be formed by: migration of metal ions through a high-resistance ion conducting layer (conductive bridge RAM); oxygen vacancies resulting from migration of oxygen ions (oxide RAM) or metal precipitates (metal-oxide RAM) in an insulating matrix; or graphene ($sp^2$) clusters in an amorphous carbon matrix (carbon RRAM). The physical characteristic for memristor operation may be based on mechanisms such as atomic configuration and rearrangement in thin-film semiconductors, electron spin polarization, and charge trapping and tunneling in nanocrystals in oxidized amorphous films. Memristors may, for instance, be formed from thin film nanostructures, e.g. thin films of $TiO_2$ or $VO_2$.

Embodiments can be envisaged in which the volatile and non-volatile characteristics for varying synaptic efficacy may be provided by alternative memory elements to that shown in FIG. 5. For example, a memory element may be formed of a single material with both volatile and non-volatile memory characteristics that can be independently controlled and exploited to provide the mechanism to shape the element's resistance dynamics or other properties related to its efficacy and thus emulate synaptic LTP, STP, and their dynamics. The independent control of the volatile and non-volatile properties may be provided by modulating different aspects of the control signal applied to the third terminal $T_3$ than aspects modulated for the signal between terminals $T_1$ and $T_2$. Examples of such aspects here include parameters such as pulse frequency, amplitude, shape, duration, voltage, current, field direction and other controlled properties of the electrical signal that could differ between different terminals. Embodiments may also be envisaged in which the volatile characteristic is controllable via signals other than voltage signals, e.g. via light or heat signals applied to the memory element. The third terminals $T_3$ for controlling such a characteristic may therefore comprise a heater, light source or other component as appropriate, and may be operatively coupled to the memory element in any suitable manner for applying the control signals. Furthermore, while the volatile and non-volatile materials may be provided by distinct components in the apparatus of FIG. 5, alternative synaptic memory elements may comprise a mixture of a volatile and a non-volatile material in a unitary structure. As before, the volatile material can be independently controlled via control signals applied to the third terminal $T_3$.

The dynamic LTP rule implemented in the PCM embodiments above allows synaptic weight to be increased, by decreasing resistance of the PCM material, based on relative spike timing through control of channel resistance. Depending on the non-volatile weight storage mechanism, other embodiments may employ a similar, but inverted, mechanism to allow synaptic weight to be decreased via a dynamic LTP rule, e.g. in the case of a pre-synaptic spike following a post-synaptic spike in the LTP rule of FIG. 2b. In FIG. 14 for such an embodiment, the function $\lambda(t)$ would then jump to a maximal positive value at the post-spike timing, and then relax towards zero thereafter.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

What is claimed is:

1. A neuromorphic synapse apparatus comprising:
   a synaptic device comprising a memory element, disposed between first and second terminals, for conducting a signal between those terminals with an efficacy which corresponds to a synaptic weight in a read mode of operation, and a third terminal directly connected to the memory element, the memory element having a non-volatile characteristic, which is programmable to vary said efficacy in a non-volatile manner in response to programming signals applied via the first and second terminals in a write mode of operation, and a volatile characteristic which is controllable to vary said efficacy in a volatile manner in response to control signals applied to the third terminal; and
   a control signal generator responsive to input signals and adapted to apply control signals to the third terminal in said read and write modes, in dependence on said input signals, to implement predetermined synaptic dynamics.

2. The apparatus of claim 1, wherein the control signal generator is adapted to apply control signals in said read mode to implement a predetermined short-term plasticity rule via control of said volatile characteristic.

3. The apparatus of claim 1 wherein the control signal generator is adapted to apply control signals in said write mode to implement a predetermined long-term plasticity rule via programming of said non-volatile characteristic.

4. The apparatus of claim 1, wherein the control signal generator is adapted:
   to apply control signals in said read mode to implement a predetermined short-term plasticity rule via control of said volatile characteristic; and
   to apply control signals in said write mode to implement a predetermined long-term plasticity rule via programming of said non-volatile characteristic.

5. The apparatus of claim 1, wherein the synaptic device is arranged for communication of signals between a pre-neuron circuit, operable to produce pre-neuron action signals, and a post-neuron circuit, operable to produce post-neuron action signals, and wherein said input signals comprise at least one of the pre-neuron and post-neuron action signals.

6. The apparatus of claim 5, wherein said input signals comprise said pre-neuron action signals and wherein the control signal generator is adapted to apply said control signals in the read mode, in dependence on timing of the pre-neuron action signals, to implement a synaptic-fatigue rule via control of said volatile characteristic.

7. The apparatus of claim 5, wherein said input signals comprise both of said pre- and post-neuron action signals and wherein the control signal generator is adapted to apply said control signals in the write mode, in dependence on relative timing of the pre- and post-neuron action signals, to implement a spike-timing dependent plasticity rule via programming of said non-volatile characteristic.

8. The apparatus of claim 1, wherein:
   the memory element comprises a resistive memory material extending between the first and second terminals and a variable-resistance channel component extending between the first and second terminals, whereby resistance of the resistive memory material can be programmed in response to said programming signals in the write mode; and the third terminal comprises a gate terminal provided on the channel component for controlling resistance of the channel component in response to said control signals in the read and write modes.

9. The apparatus of claim 8, wherein:
the variable-resistance channel component extends between the first and second terminals in contact with the resistive memory material, and wherein respective lengths along the channel component of high- and low-resistance regions of the resistive memory material can be varied in response to said programming signals to program resistance of the resistive memory material in the write mode; and
the control signal generator is adapted such that control signals applied to the gate terminal in the read mode provide a resistance of the channel component which is between that of said high- and low-resistance regions of the resistive memory material.

10. The apparatus of claim 9, wherein the channel component comprises an elongate annulus, the resistive memory material is disposed within the annulus, and the gate terminal is provided on an outer surface of the annulus.

11. The apparatus of claim 9, wherein the resistive memory material comprises a phase-change memory material, said high- and low-resistance regions comprising amorphous and crystalline phases respectively of the material.

12. The apparatus of claim 8, wherein the control signal generator is adapted to apply control signals in the read mode to implement a predetermined short-term plasticity rule via controlling resistance of the channel component.

13. The apparatus of claim 8, wherein the control signal generator is adapted to apply control signals in the write mode to implement a predetermined long-term plasticity rule via programming resistance of the resistive memory material.

14. The apparatus of claim 8, wherein the control signal generator is adapted:
to apply control signals in said read mode to implement a predetermined short-term plasticity rule via controlling resistance of the channel component; and
to apply control signals in said write mode to implement a predetermined long-term plasticity rule via programming resistance of the resistive memory material.

15. The apparatus of claim 8, wherein the synaptic device is arranged for communication of signals between a pre-neuron circuit, operable to produce pre-neuron action signals, and a post-neuron circuit, operable to produce post-neuron action signals, and wherein said input signals comprise at least one of the pre-neuron and post-neuron action signals.

16. The apparatus of claim 15, wherein said input signals comprise said pre-neuron action signals and wherein the control signal generator is adapted to apply said control signals in the read mode, in dependence on timing of the pre-neuron action signals, to implement a synaptic-fatigue rule via controlling resistance of the channel component.

17. The apparatus of claim 15, wherein said input signals comprise both of said pre- and post-neuron action signals and wherein the control signal generator is adapted to apply said control signals in the write mode, in dependence on relative timing of the pre- and post-neuron action signals, to implement a spike-timing dependent plasticity rule via programming resistance of the resistive memory material.

* * * * *